US012694483B2

(12) United States Patent     (10) Patent No.:    US 12,694,483 B2
Jha et al.                        (45) Date of Patent:        Jul. 28, 2026

(54) SYSTEMS AND METHODS FOR A TASK-SPECIFIC DEEP-LEARNING-BASED DENOISING APPROACH FOR MYOCARDIAL PERFUSION SPECT

(71) Applicant: Washington University, St. Louis, MO (US)

(72) Inventors: Abhinav Kumar Jha, St. Louis, MO (US); Md Ashequr Rahman, St. Louis, MO (US); Zitong Yu, St. Louis, MO (US); Barry Siegel, St. Louis, MO (US)

(73) Assignee: Washington University, St. Louis, MO (US)

( * ) Notice: Subject to any disclaimer, the term of this patent is extended or adjusted under 35 U.S.C. 154(b) by 207 days.

(21) Appl. No.: 18/416,567

(22) Filed: Jan. 18, 2024

(65) Prior Publication Data

US 2024/0249396 A1     Jul. 25, 2024

Related U.S. Application Data

(60) Provisional application No. 63/480,572, filed on Jan. 19, 2023.

(51) Int. Cl.
*G06T 5/70*          (2024.01)
*G06T 7/00*          (2017.01)

(52) U.S. Cl.
CPC .............. *G06T 5/70* (2024.01); *G06T 7/0012* (2013.01); *G06T 2207/10108* (2013.01); *G06T 2207/20081* (2013.01)

(58) Field of Classification Search
CPC ..................... G06T 5/70; G06T 7/0012; G06T 2207/10108; G06T 2207/20081;
(Continued)

(56) References Cited

U.S. PATENT DOCUMENTS 9,589,374 B1 *    3/2017  Gao ..................... A61B 6/5211
10,792,006 B2 *  10/2020  Zhu ........................ A61B 6/563
(Continued)

FOREIGN PATENT DOCUMENTS

CN         115082342 A        9/2022
CN         117813055 A        4/2024

OTHER PUBLICATIONS

Rahman, Ashequr, et al. "A task-specific deep-learning-based denoising approach for myocardial perfusion SPECT." Medical Imaging 2023: Image Perception, Observer Performance, and Technology Assessment. vol. 12467. SPIE, 2023.
(Continued)

*Primary Examiner* — Michael S Osinski
(74) *Attorney, Agent, or Firm* — Armstrong Teasdale LLP

(57)          ABSTRACT

A system for single-photon emission computed tomography (SPECT) is provided. The system includes a computer device comprises at least one processor in communication with at least one memory device. The at least one processor is programmed to: a) store a model trained to denoise computer tomography (CT) scans of a subject being examined; b) receive a CT scan of a first subject being examined; c) execute the model with the CT scan of the first subject as an input, wherein the model performs denoising on the CT scan while accounting for an observer loss function; and d) output a denoised-CT scan of the first subject.

17 Claims, 8 Drawing Sheets

(58) Field of Classification Search

CPC ............ G06T 5/60; G06T 2207/20084; G06T 2207/10081; G06T 2207/30004; G06T 11/008; G06T 11/005; G06T 2207/10104; G06T 11/006; G06T 2207/10116; G06T 2211/441; G06T 5/50; G06T 2207/10072; G06T 11/003; A61B 6/032; A61B 6/037; A61B 6/5205; A61B 6/5258; A61B 6/482; A61B 6/542; A61B 6/5217; A61B 6/5235; A61B 6/03; G06N 3/0464; G06N 3/08; G06N 3/045; G06N 3/09; G06N 3/0455; G06N 3/0475; G06N 3/094; G06N 3/084

See application file for complete search history.

(56) References Cited

U.S. PATENT DOCUMENTS

| | | | | |
|---|---|---|---|---|
| 11,790,492 B1 * | 10/2023 | Ahmad | ............... | G06N 3/0495 |
| 11,844,636 B2 * | 12/2023 | Zaharchuk | ............ | G16H 30/40 |
| 12,064,281 B2 * | 8/2024 | Qi | ............................ | G06N 3/08 |
| 12,100,075 B2 * | 9/2024 | Massanes Basi | ..... | G06T 11/008 |
| 12,106,452 B2 * | 10/2024 | Kaethner | ................. | G06T 5/60 |
| 12,148,073 B2 * | 11/2024 | Fuchs | ................... | A61B 6/037 |
| 2011/0164799 A1 * | 7/2011 | Miao | ..................... | G06T 11/006 |
| | | | | 382/131 |
| 2017/0071562 A1 * | 3/2017 | Suzuki | ................. | A61B 6/5211 |
| 2018/0042564 A1 * | 2/2018 | Zhou | ....................... | A61B 6/482 |
| 2019/0156524 A1 * | 5/2019 | Park | ......................... | G06T 5/60 |
| 2020/0118306 A1 * | 4/2020 | Ye | ........................ | G06T 11/008 |
| 2020/0294288 A1 * | 9/2020 | Smith | .................... | G16H 30/40 |
| 2020/0311490 A1 * | 10/2020 | Lee | ........................... | G06T 5/60 |
| 2020/0311914 A1 * | 10/2020 | Zaharchuk | ............ | G16H 50/50 |
| 2020/0330626 A1 | 10/2020 | Ting et al. | | |
| 2021/0052233 A1 * | 2/2021 | Kaplan | ............... | A61B 6/5205 |
| 2021/0073950 A1 * | 3/2021 | Vija | ..................... | G06N 3/0455 |
| 2021/0118098 A1 * | 4/2021 | Chan | ........................ | G06N 3/08 |
| 2021/0279918 A1 * | 9/2021 | Koga | .................... | A61B 6/544 |
| 2021/0366169 A1 * | 11/2021 | Liu | ..................... | A61B 6/5205 |
| 2021/0390668 A1 * | 12/2021 | Ren | ........................... | G06T 5/70 |
| 2022/0092742 A1 * | 3/2022 | Pei | ....................... | G06N 3/0475 |
| 2022/0207791 A1 | 6/2022 | Shi et al. | | |
| 2022/0284643 A1 * | 9/2022 | Jha | ........................ | G06T 11/005 |
| 2022/0375038 A1 * | 11/2022 | Nagare | ................. | G06V 10/30 |
| 2023/0083935 A1 * | 3/2023 | Lu | .......................... | A61B 6/032 |
| | | | | 382/131 |
| 2023/0237638 A1 * | 7/2023 | Li | .......................... | G06T 7/0004 |
| | | | | 382/128 |
| 2023/0326101 A1 * | 10/2023 | Lakshminarasimha et al. | ........... | G06T 11/005 |
| | | | | 382/131 |
| 2023/0342999 A1 | 10/2023 | Liu et al. | | |
| 2023/0390583 A1 * | 12/2023 | Kadoya | .................. | A61N 5/103 |
| 2024/0029246 A1 * | 1/2024 | Keshwani | ........... | A61B 6/5217 |
| 2024/0046534 A1 * | 2/2024 | Yang | ..................... | G06T 11/006 |
| 2024/0046535 A1 | 2/2024 | Carmi | | |
| 2024/0104700 A1 * | 3/2024 | Wang | ..................... | G06N 3/096 |
| 2024/0122566 A1 * | 4/2024 | Cziria | ...................... | G06T 7/33 |
| 2024/0144442 A1 * | 5/2024 | Wang | ................... | A61B 6/5258 |
| 2024/0169608 A1 * | 5/2024 | Liu | ........................ | G06T 11/008 |
| 2024/0169610 A1 * | 5/2024 | Li | .......................... | G06T 3/4046 |
| 2024/0303815 A1 * | 9/2024 | Oh | ........................ | G06V 10/774 |
| 2024/0307018 A1 * | 9/2024 | Xiang | .................. | A61B 6/5258 |
| 2025/0014265 A1 * | 1/2025 | O'Connor | ................. | G06T 5/77 |
| 2025/0057499 A1 * | 2/2025 | Wuelker | ................ | A61B 6/482 |
| 2025/0078215 A1 * | 3/2025 | Bergner | ..................... | G06T 5/70 |
| 2025/0245820 A1 * | 7/2025 | Zainulina | .............. | G06T 7/0012 |
| 2025/0345010 A1 * | 11/2025 | Hu | ......................... | A61B 6/037 |

OTHER PUBLICATIONS

Zitong Yu, Md Ashequr Rahman, Thomas Schindler, Richard Laforest, Abhinav K. Jha, A physics and learning-based transmission-less attenuation compensation method for SPECT, Proc. SPIE Medical Imaging, 2021.

Chen, Xiongchao et al., "Direct and indirect strategies of deep-learning-based attenuation correction for general purpose and dedicated cardiac Spect"; HHS Public Access Eur J Nucl Med Mol Imaging: Jul. 2022; 3046-3060. doi: 10.1007/s00259-022-05718-8; 26 pp.

Robert D. Johnson, Navkanwal Kaur Bath, Jeffrey Rinker, Stephen Fong, Sara St. James, Miguel Hernandez Pampaloni, Thomas A . Hope. Introduction to the D-SPECT for Technologists: Workflow Using a Dedicated Digital Cardiac Camera Journal of Nuclear Medicine Technology Dec. 2020 (Year: 2020).

Shi, L., Onofrey, J.A., Liu, H. et al. Deep learning-based attenuation map generation for myocardial perfusion SPECT. Eur J Nucl Med Mol Imaging 47, 2383-2395 (2020). (Year: 2020).

* cited by examiner

SYSTEMS AND METHODS FOR A TASK-SPECIFIC DEEP-LEARNING-BASED DENOISING APPROACH FOR MYOCARDIAL PERFUSION SPECT

CROSS REFERENCE TO RELATED APPLICATIONS

This application claims priority to U.S. Provisional Patent Application 63/480,572, filed, Jan. 19, 2023, which is hereby incorporated by reference in its entirety.

STATEMENT REGARDING FEDERALLY SPONSORED RESEARCH & DEVELOPMENT

This invention was made with government support under EB024647, EB031051, EB022827, EB031962 awarded by the National Institutes of Health. The government has certain rights in the invention.

BACKGROUND

The present disclosure generally relates to computer-aided systems and methods of performing myocardial perfusion single-photon emission computed tomography (SPECT) imaging, and more specifically to estimate normal-dose images given myocardial perfusion SPECT images acquired at low doses.

Myocardial perfusion SPECT (MPS) has an important and well-validated role in the diagnosis of coronary artery disease and is currently a key workhorse for the cardiac imaging market. However, this imaging modality requires administering radiation dose to the patient and requires scanning the patient on a SPECT scanner for a long time. Thus, there is an important need to develop methods to reduce this radiation dose and/or reduce the acquisition time. Accordingly, it is desirable to find a methodology to address this problem.

BRIEF DESCRIPTION

In a first aspect, a system for single-photon emission computed tomography (SPECT) is provided. The system includes a computer device comprises at least one processor in communication with at least one memory device. The at least one processor is programmed to: a) store a model trained to denoise computer tomography (CT) scans of a subject being examined; b) receive a CT scan of a first subject being examined; c) execute the model with the CT scan of the first subject as an input, wherein the model performs denoising on the CT scan while accounting for an observer loss function; and d) output a denoised-CT scan of the first subject. The system may include additional, less, or alternate functionality, including that discussed elsewhere herein.

In a second aspect, a method for single-photon emission computed tomography (SPECT) is provided. The method is implemented by a computer device including at least one processor in communication with one or more memory devices. The method includes: a) storing a model trained to denoise computer tomography (CT) scans of a subject being examined; b) receiving a CT scan of a first subject being examined; c) executing the model with the CT scan of the first subject as an input, wherein the model performs denoising on the CT scan while accounting for an observer loss function; and d) outputting a denoised-CT scan of the first subject. The method may include additional, less, or alternate functionality, including that discussed elsewhere herein.

In a third aspect, a computer device for single-photon emission computed tomography (SPECT) is provided. The computer device includes at least one processor in communication with at least one memory device. The at least one processor is programmed to: a) store a model trained to denoise computer tomography (CT) scans of a subject being examined; b) receive a CT scan of a first subject being examined; c) execute the model with the CT scan of the first subject as an input, wherein the model performs denoising on the CT scan while accounting for an observer loss function; and d) output a denoised-CT scan of the first subject. The computer device may include additional, less, or alternate functionality, including that discussed elsewhere herein.

BRIEF DESCRIPTION OF THE DRAWINGS

Those of skill in the art will understand that the drawings, described below, are for illustrative purposes only. The drawings are not intended to limit the scope of the present teachings in any way.

Figure 1:
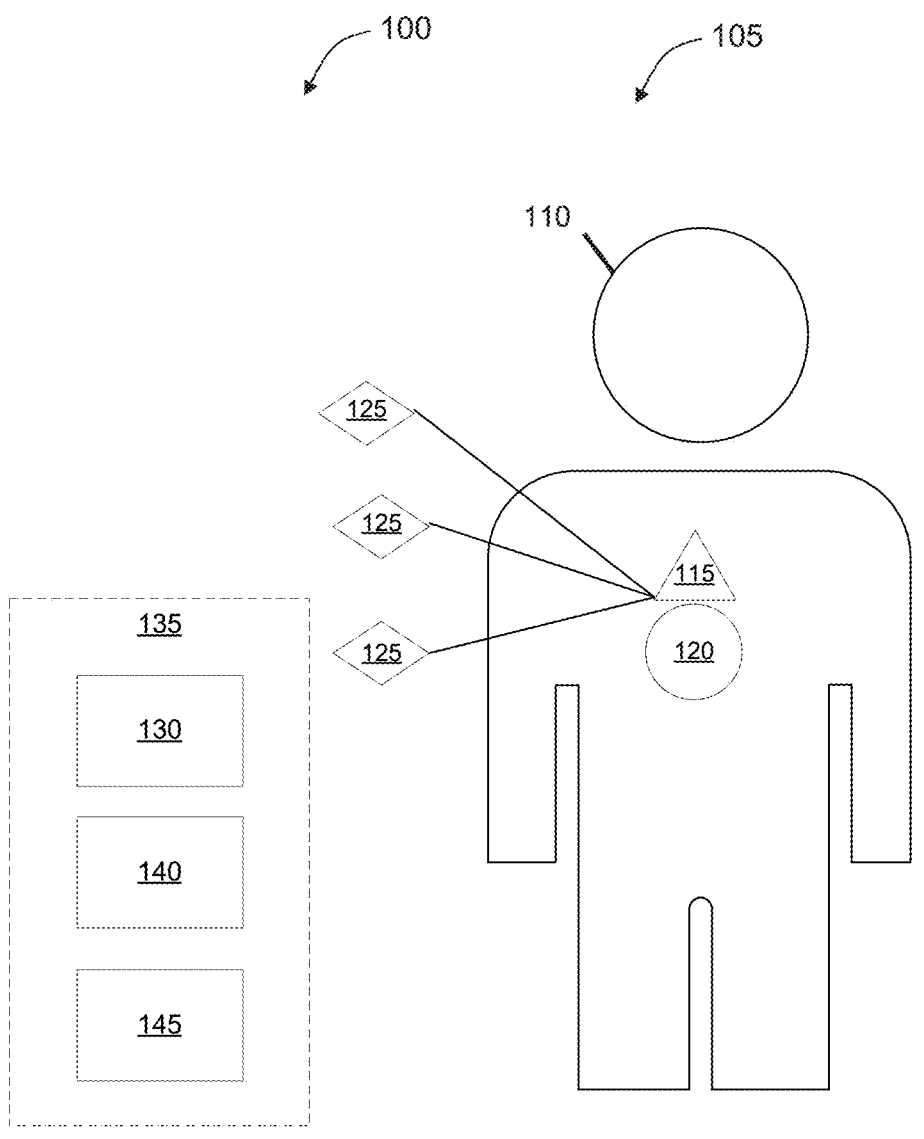
FIG. 1 illustrates a system for performing myocardial perfusion SPECT imaging in an imaging environment in accordance with at least one embodiment.

There are shown in the drawings arrangements that are presently discussed, it being understood, however, that the present embodiments are not limited to the precise arrangements and are instrumentalities shown. While multiple embodiments are disclosed, still other embodiments of the present disclosure will become apparent to those skilled in the art from the following detailed description, which shows and describes illustrative aspects of the disclosure. As will be realized, the invention is capable of modifications in various aspects, all without departing from the spirit and scope of the present disclosure. Accordingly, the drawings and detailed description are to be regarded as illustrative in nature and not restrictive.

DETAILED DESCRIPTION

The present disclosure generally relates to computer-aided systems and methods of performing myocardial perfusion single-photon emission computed tomography (SPECT) imaging, and more specifically to estimate normal-dose images given myocardial perfusion SPECT (MPS)

images acquired at low doses. Myocardial perfusion single-photon emission computed tomography (SPECT) (MPS) has an established and well-validated role in improving the diagnosis of coronary artery disease. However, there is an important need for methods to reduce the administered radiation dose to the patient in MPS studies. In this context, deep-learning (DL)-based methods have shown substantial promise in predicting images at normal dose from the images acquired at low dose, a process referred to as "denoising". The present disclosure describes using deep-learning (DL)-based methods to denoise myocardial perfusion SPECT images acquired at low dose. Typically, these methods are designed to minimize some fidelity-based criterion, such as the pixel-wise mean square error, between the denoised image and the normal-dose images. These methods have shown promise when evaluated using fidelity-based figures of merit (FoMs) such as root mean squared error (RMSE) and structural similarity metric (SSIM). However, medical images are acquired for specific clinical tasks. For clinical application of these methods, evaluation on clinical tasks is crucial. Typically, these methods are designed to minimize some fidelity-based criterion between the predicted denoised image and some reference normal-dose image. However, while promising, these methods have failed to improve performance on clinical tasks in SPECT. Thus, for clinical application of these denoising methods, the images should be evaluated based on their performance in clinically relevant tasks. To address this issue, the present disclosure outlines a DL-based denoising approach that is designed to preserve the observer-related task-specific information. Thus, a methodology that can help preserve this task-specific information may help to address this issue, while also leveraging the ability of DL-based technology to learn more images of patient populations. Accordingly, DL is used to provide a mechanism to improve observer performance in low-dose myocardial perfusion SPECT.

The systems and methods described herein recite a novel three-dimensional (3D) DL-based denoising method that preserves information for the signal-detection task in a signal-known-statistically/background-known-statistically (SKS/BKS) setup. To preserve this information, the DL-based method is designed to minimize the distance between the output of anthropomorphic channels applied to the predicted and true normal dose images. The system then evaluates this method on the clinical task of detecting perfusion defects in MPS images for a task where the defect location, severity and extent are all varying. The method is objectively evaluated using a dataset derived from clinical MPS images and on this SKS/BKS detection task.

By reducing the radiation dose, this disclosure is not just expected to benefit patients being given this imaging currently, but also expected to make this modality even more widely used.

While this disclosure describes myocardial perfusion, one having skill in the art would understand that analysis of other parts of the body and/or items may be used in concert with the systems and methods described herein.

FIG. 1 illustrates a system 100 for performing myocardial perfusion SPECT imaging in an imaging environment 105 in accordance with at least one embodiment.

In the exemplary embodiment, a patient 110 receives a radioactive tracer injection 115 to image their heart 120. The radioactive tracer injection 115 emits gamma($\gamma$)-ray photons 125, which exit the patient's body. A sensor 130, such as, but not limited to, a $\gamma$ camera, detects the $\gamma$-ray photons 125. The sensor 130 is a part of a single-photon emission computed tomography (SPECT) system 135. The SPECT system 135 also includes a denoising computer system 140 for performing the analysis described herein to provide images of the patient's heart 120 while the patient's heart 120 is stressed, such as from exercise or particular medications, and at rest.

In some embodiments, the SPECT system 135 includes, or is in communication with a computed tomography (CT) device 145. The CT device 145 may be a CT machine or CT scanning machine. The CT device 145 provides scans of the patient 110, or item being imaged, to allow the SPECT system 135 to generate images of the patient's heart 120 and surrounding area based upon where on the patient's body the photons originated.

Figure 2:
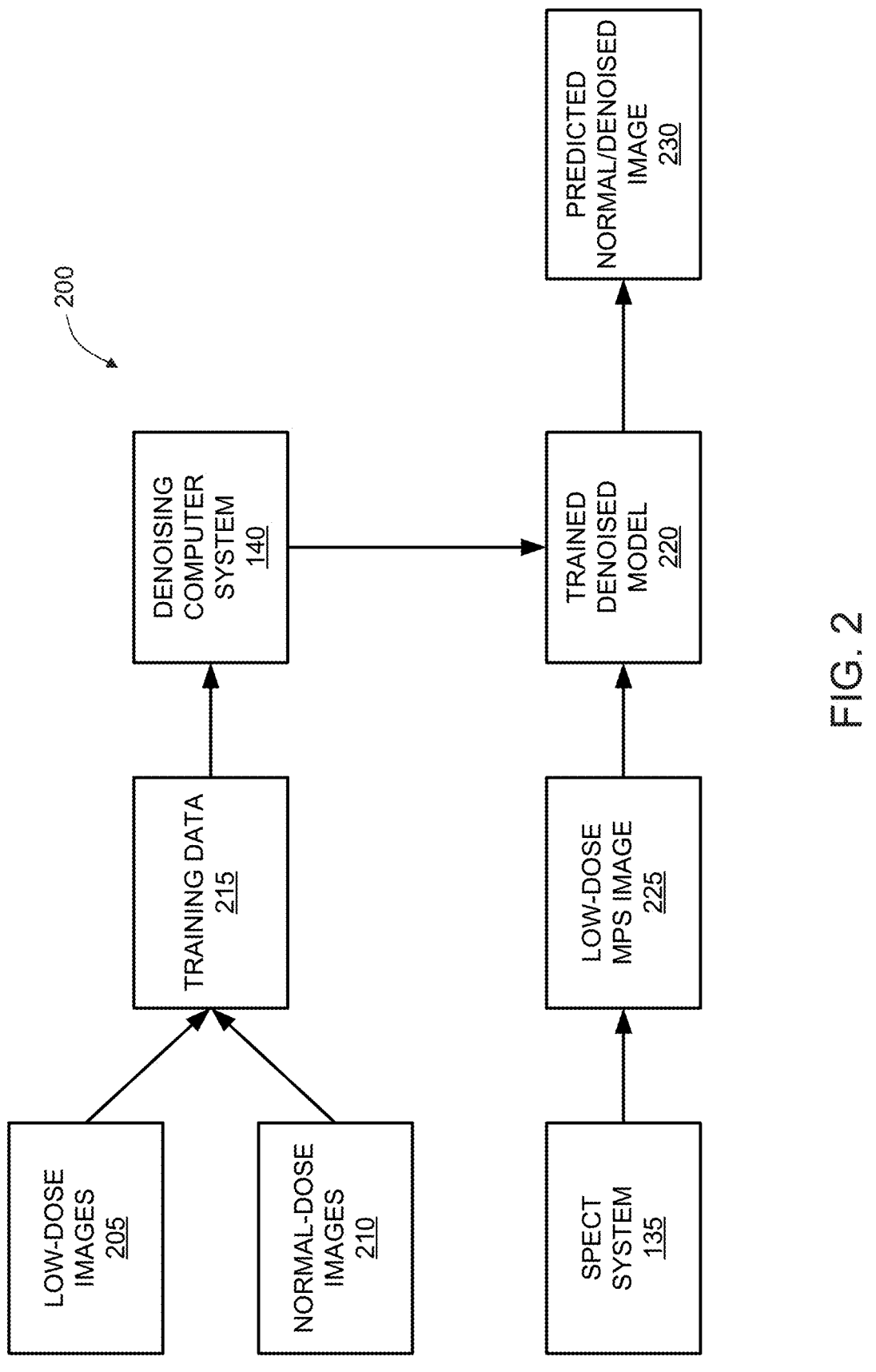
FIG. 2 illustrates an exemplary architecture for predicting normal dose myocardial perfusion SPECT (MPS) images from low-dose MPS images in accordance with at least one embodiment.

FIG. 2 illustrates an exemplary architecture 200 for predicting normal dose myocardial perfusion SPECT (MPS) images from low-dose MPS images in accordance with at least one embodiment. The architecture 200 is used to provide supervised training to a denoising method with the goal of predicting normal dose MPS images from low-dose MPS images such that performance on the signal-detection task improves.

In the exemplary embodiments, low-dose MPS images 205 and normal dose MPS images 210 are combined to create the training data 215. The training data 215 is then input to the denoising computer system 140 to generate a trained model 220 for denoising. The trained model 220 is trained to receive low-dose MPS images 225 from the SPECT system 135 as inputs and provide predicted normal dose/denoised MPS images 230 as outputs. The predicted normal dose/denoised MPS images 230 are denoised as described below to retain the needed features for visual inspection by a human observer, such as a health care provider.

Architecture 200 supports a supervised denoising method with the goal of predicting normal dose MPS images 230 from low-dose MPS images 225 such that performance on the signal-detection task improves. To predict the normal-dose image 230 while also preserving the task-specific information, the denoising computer system 140 uses a loss function that consists of a fidelity term and an observer-based loss term. The fidelity term computes the mean squared error between the normal dose images 210 and the denoised images 230. For the observer-loss term, the detection task on MPS images may be performed by human observers. For the purposes of training the model 220, the denoising computer system 140 can emulate the human observer performance with a Channelized Hoteling Observer (CHO) with anthropomorphic rotationally symmetric frequency channels on the SKE/BKS task. Thus, the denoising computer system 140 provides the observer-based loss term that penalizes the mean squared error between the channel vectors obtained by applying these channels on the normal dose image and the denoised image predicted by the DL approach.

The denoising computer system 140 denotes the total number of patient images by J, and the $j^{th}$ sample of the normal and low-dose images by N–D vectors $$\hat{f}^j_{ND} \text{ and } \hat{f}^j_{LD},$$

respectively. Further, the denoising computer system 140 denotes the denoising operator by $D_\Theta$, an operator parameterized by $\Theta$. The denoising computer device 140 denotes the predicted normal-dose image by $$\hat{f}_{ND}^{pred,j} = D_{\Theta}(\hat{f}_{LD}^{j}).$$

Moreover, the denoising computer system 140 denotes the anthropomorphic channel operator as U, as a $C \times N_{2D}$ matrix where C denotes the number of channels and $N_{2D}$ is the dimension of each image slice. Note that $N = N_{2D} \times$ number of slices. This configuration accounts for the defect being present at multiple locations. In the training process, to apply the channel operator, the denoising computer system 140 performs acyclic 2-D shifting for each anthropomorphic channel so that the center of the channel coincides with the centroid of the defect. The denoising computer system 140 denotes the shift operator for the $j^{th}$ sample by $S^{j}$. Thus, $S^{j}U$ denotes a $C \times N_{2D}$ matrix where each channel is centered to the centroid of the defect of the $j^{th}$ sample. Also, the N2d-D vector $\hat{f}^{j}[s]$ denotes the $s^{th}$ slice of the 3D image $\hat{f}^{j}$. Accordingly, the loss function is given by:

$$L(\Theta) = \frac{1}{J}\sum_{j=1}^{J}\left\{(1-\lambda)\left\|\hat{f}_{ND}^{j} - \hat{f}_{ND}^{pred,j}\right\|_{2}^{2} + \lambda\sum_{s=s_{s}}^{s_{2}}\left\|(S^{j}U)\left(\hat{f}_{ND}^{j}[s] - \hat{f}_{ND}^{pred,j}[s]\right)\right\|_{2}^{2}\right\}$$

where $s_1$ and $s_2$ denote the range of slices for with observer-loss is calculated.

In one embodiment, a sample training data set 215 may be created to include low-dose images 205 and normal dose images 210. The training data set 215 may also include patients with and without a defect. In some embodiments, the training data 215 may start with normal dose images 210 of healthy patients. Then the training data may be implanted with synthetic defect types or defects seen in other patients. These defect types are defined in terms of their position in LV wall, the extent of the defect and the severity of the defect. For example, the defects may be positioned at anterior and inferior wall, had an extent of 30° and 60°, and a severity of 10%, 25% and 50%. The defects may then be inserted into healthy patient images to generate the defect-present population. We used clinical MPS images from patients (N=648) acquired at Washington University School of Medicine between January 2016 and July 2018, with SPECT projection data and CT images along with patient gender and clinical reports (Table 1). Furthermore, some or all of the normal dose images 210 are then resampled, such as a using a binomial sampling to create the low-dose images 205. In some embodiments, the binomial sampling simulates low-dose levels of 12.5% and 6.25% of the normal dose. These defect-present, defect-absent, normal dose, and low dose populations are then be combined into the training data 215 used to train the above-described DL-based approach.

While the above is one way of generating training data 215, one having skill in the art would understand that other methodologies may be used to train the trained model 220 for denoising.

In some further embodiments, low-dose MPS images 225 and predicted/denoised MPS images 230 are compared, rated, and fed back to the denoising computer system 140 to further train and/or update the model 220.

Figure 3:
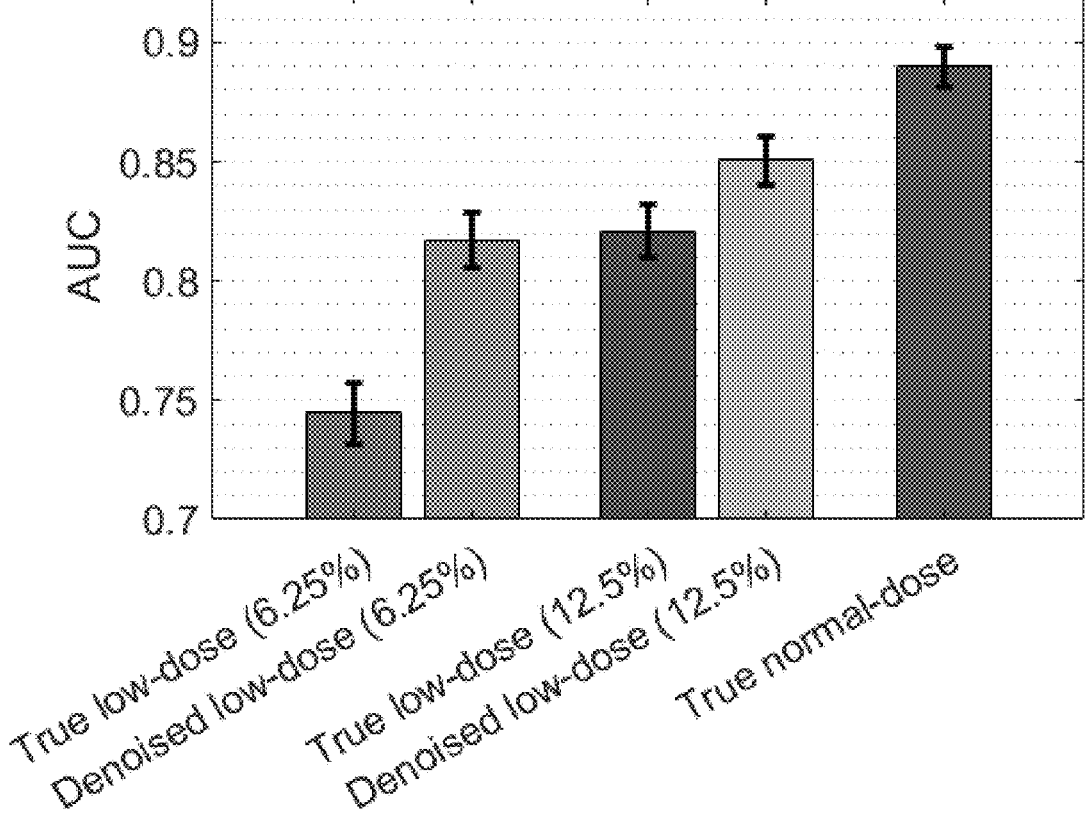
FIG. 3 illustrates the AUC (area under the roc curve) values obtained.

FIG. 3 illustrates the AUC (area under the roc curve) values obtained. These include the normal dose images, low-dose images at 12.5% and 6.25% and finally, the AUC value obtained by the denoising method at these low-dose levels. The error bars denote the 95% confidence intervals. The results illustrate that there is a statistically significant increase in observer performance at both these low-dose levels when the proposed denoising method is used.

Figures 4A, 4B, 4C, 4D:
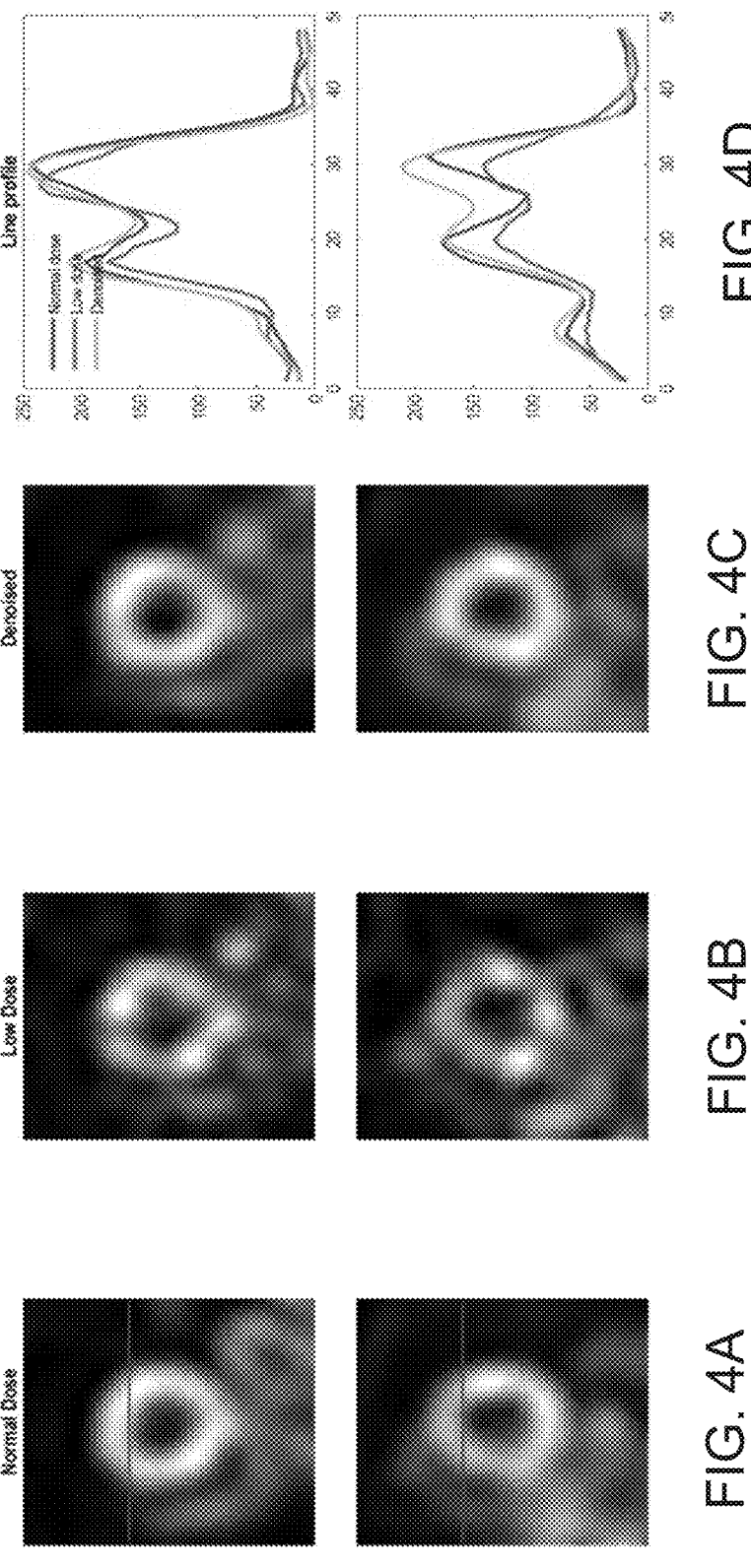
FIGS. 4A-4D illustrates some representative images.

FIGS. 4A-4D illustrates some representative images. FIG. 4A illustrates short-axis normal-dose images 210. FIG. 4B illustrates low-dose images 205. FIG. 4C illustrates denoised images 230. FIG. 4D illustrates horizontal line profiles.

Figure 5:
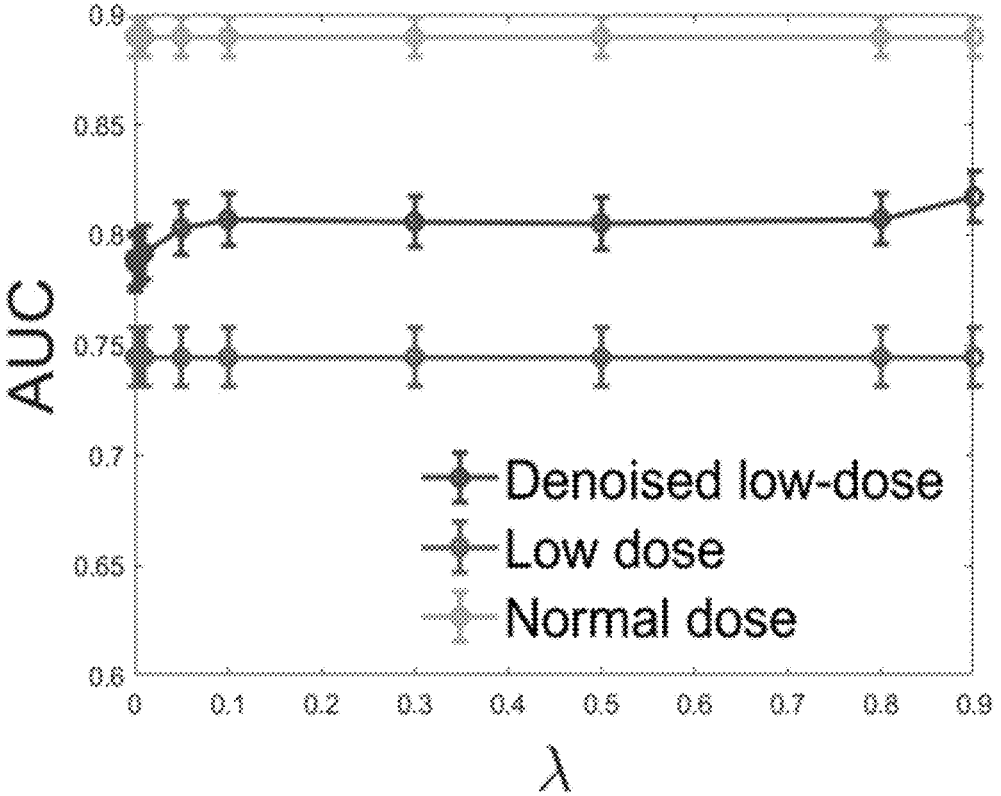
FIG. 5 illustrates the impact of varying the hyperparameter on performance of the denoising method.

FIG. 5 illustrates the impact of varying the hyperparameter on performance of the denoising method. This includes the AUC values as a function of $\lambda$ for 6.25% dose level, the normal-dose, and the low-dose. This indicates that assigning a higher weight to the task-specific loss term (as achieved by increasing lambda) leads to improved observer performance.

Figure 6:
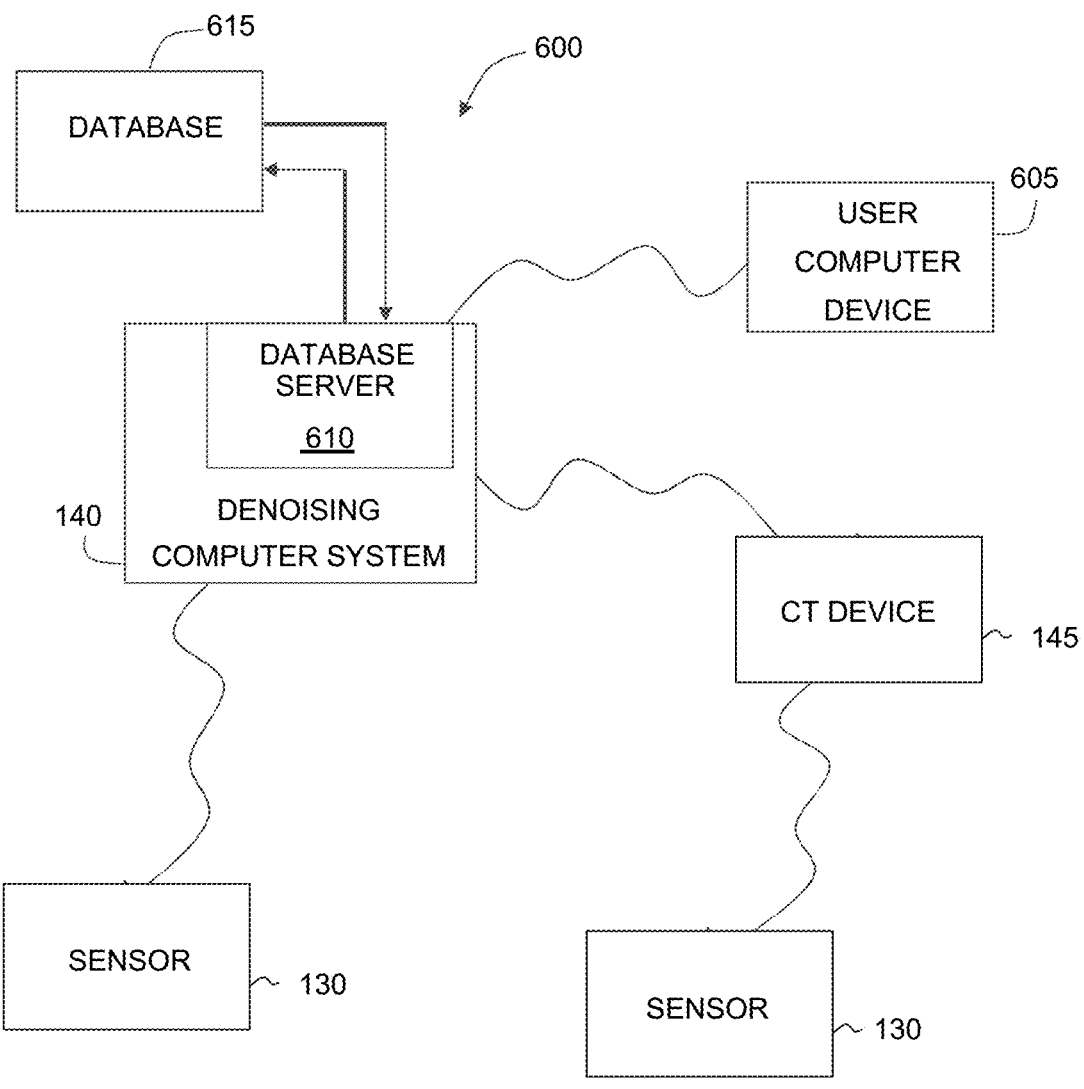
FIG. 6 illustrates a simplified block diagram of an exemplary computer system for predicting normal dose myocardial perfusion SPECT (MPS) images from low-dose MPS images.

FIG. 6 illustrates a simplified block diagram of an exemplary computer system 600 for predicting normal dose myocardial perfusion SPECT (MPS) images from low-dose MPS images. In the exemplary embodiment, computer system 600 may be used for training and using a model for denoising low-dose MPS images 225 (shown in FIG. 2) in a patient 110 (shown in FIG. 1). As described below in more detail, a denoising computer device 140 may be configured to a) store a model 220 trained to denoise computer tomography (CT) scans 225 of a subject 110 being examined; b) receive a CT scan 225 of a first subject 110 being examined; c) execute the model 220 with the CT scan 225 of the first subject 110 as an input, wherein the model 220 performs denoising on the CT scan 225 while accounting for an observer loss function; and d) output a denoised-CT scan 230 of the first subject 110.

In the exemplary embodiment, user computer devices 605 are computers that include a web browser or a software application, which enables user computer devices 605 to access remote computer devices, such as the denoising computer device 140, using the Internet or other network. More specifically, user computer devices 605 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computer devices 605 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

A database server 610 may be communicatively coupled to a database 315 that stores data. In one embodiment, database 615 may include the training data 215, the trained model 220 for denoising, low-dose MPS images 225, and predicted normal dose/denoised MPS images 230 (all shown in FIG. 2). In the exemplary embodiment, database 615 may be stored remotely from the denoising computer device 140. In some embodiments, database 615 may be decentralized. In the exemplary embodiment, the user may access database 615 via user computer device 605 by logging onto denoising computer device 140, as described herein.

Denoising computer device 140 may be communicatively coupled with one or more sensors 130, CT Device 145, and user computer device 605. In some embodiments, denoising computer device 140 may be associated with, or is part of a computer network associated with a SPECT system 135 or individual scanner. In other embodiments, denoising computer device 140 may be associated with a third party and is merely in communication with the SPECT system 135. More specifically, the denoising computer device 140 is communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. The denoising computer device 140 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In the exemplary embodiment, the denoising computer device 140 hosts an application or website that allows the user to perform analysis of predicted normal dose/denoised MPS images 230 provided by the denoising computer system 140 and the trained model 220 for denoising.

Figure 7:
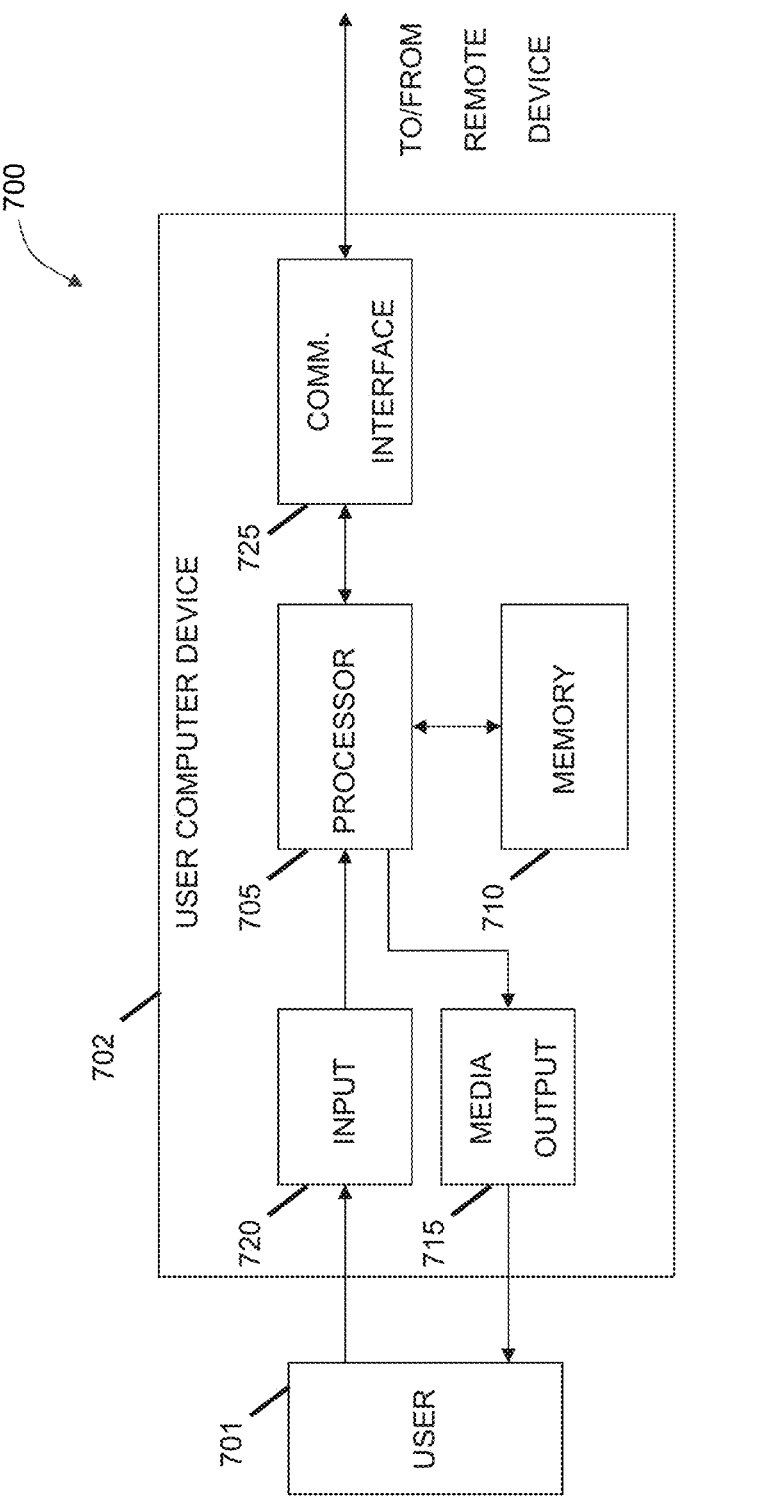
FIG. 7 illustrates an example configuration of a client system shown in FIG. 6, in accordance with one embodiment of the present disclosure.

FIG. 7 depicts an exemplary configuration of the computer devices shown in FIGS. 1, 2, and 6, in accordance with one embodiment of the present disclosure. User computer device 702 may be operated by a user 701. User computer device 702 may include, but is not limited to, denoising computer device 140 (shown in FIG. 1) and user computer device 605 (shown in FIG. 6). User computer device 702 may include a processor 705 for executing instructions. In some embodiments, executable instructions are stored in a memory area 710. Processor 705 may include one or more processing units (e.g., in a multi-core configuration). Memory area 710 may be any device allowing information such as executable instructions and/or transaction data to be stored and retrieved. Memory area 710 may include one or more computer readable media.

User computer device 702 may also include at least one media output component 715 for presenting information to user 701. Media output component 715 may be any component capable of conveying information to user 701. In some embodiments, media output component 715 may include an output adapter (not shown) such as a video adapter and/or an audio adapter. An output adapter may be operatively coupled to processor 705 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 715 may be configured to present a graphical user interface (e.g., a web browser and/or a client application) to user 701. A graphical user interface may include, for example, a predicted normal dose/denoised MPS images 230 (shown in FIG. 2). In some embodiments, user computer device 702 may include an input device 720 for receiving input from user 701. User 701 may use input device 720 to, without limitation, select and/or enter one or more predicted normal dose/denoised MPS images 230.

Input device 720 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 715 and input device 720.

User computer device 702 may also include a communication interface 725, communicatively coupled to a remote device such as denoising computer device 140, CT device 145, or sensor 130 (all shown in FIG. 1). Communication interface 725 may include, for example, a wired or wireless network adapter and/or a wireless data transceiver for use with a mobile telecommunications network.

Stored in memory area 710 are, for example, computer readable instructions for providing a user interface to user 701 via media output component 715 and, optionally, receiving and processing input from input device 720. A user interface may include, among other possibilities, a web browser and/or a client application. Web browsers enable users, such as user 701, to display and interact with media and other information typically embedded on a web page or a website from denoising computer system 140. A client application allows user 701 to interact with, for example, sensors 130. For example, instructions may be stored by a cloud service, and the output of the execution of the instructions sent to the media output component 715.

Processor 705 executes computer-executable instructions for implementing aspects of the disclosure. In some embodiments, the processor 705 is transformed into a special purpose microprocessor by executing computer-executable instructions or by otherwise being programmed. For example, the processor 705 may be programmed with the instructions such as those described in FIG. 2.

In some embodiments, user computer device 702 may include, or be in communication with, one or more sensors, such as sensor 130. User computer device 702 may be configured to receive data from the one or more sensors and store the received data in memory area 710. Furthermore, user computer device 702 may be configured to transmit the sensor data to a remote computer device, such as denoising computer device 140, through communication interface 725.

Figure 8:
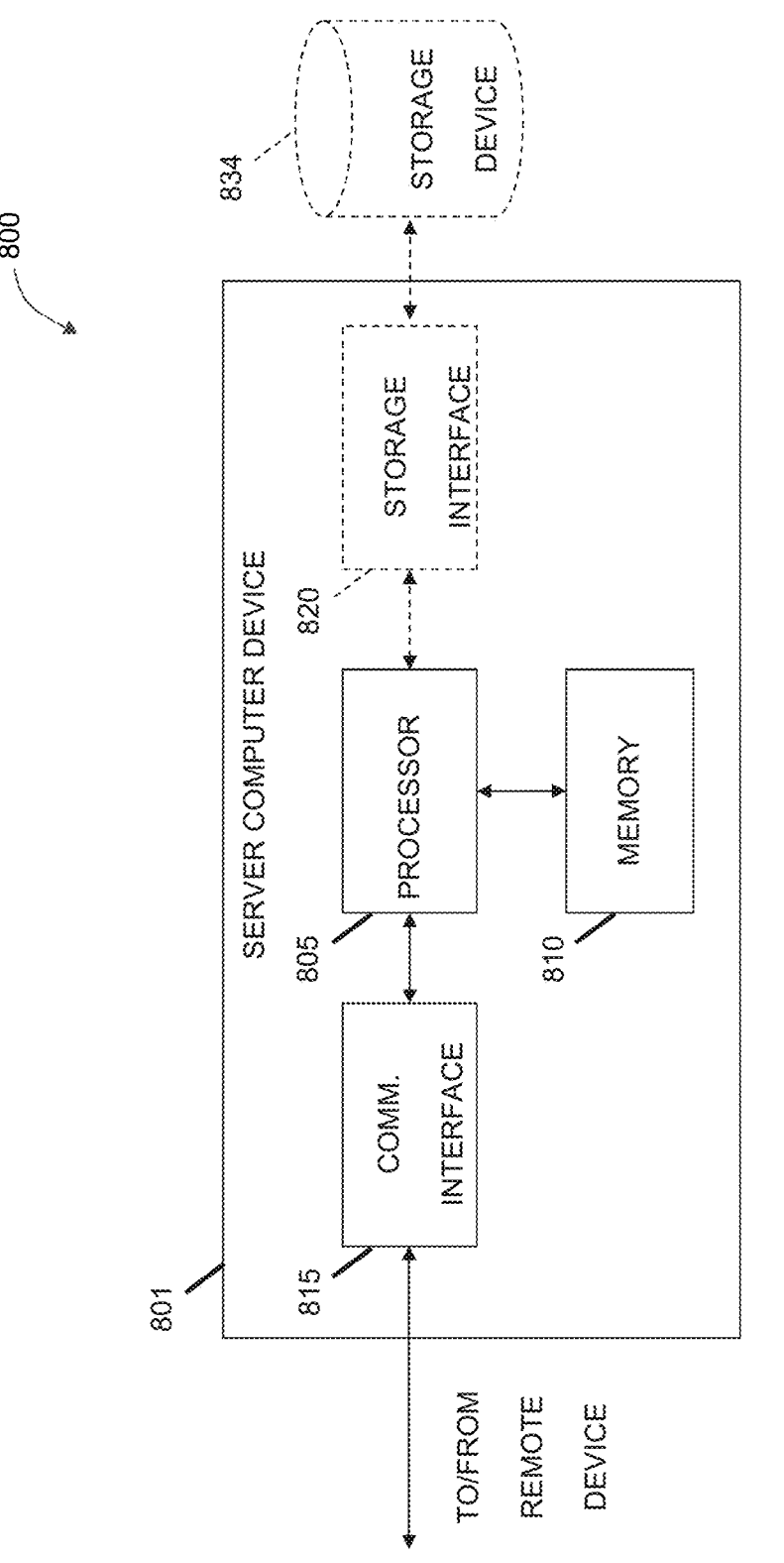
FIG. 8 illustrates an example configuration of a server system shown in FIG. 6, in accordance with one embodiment of the present disclosure.

FIG. 8 illustrates an example configuration of the server system shown in FIG. 6, in accordance with one embodiment of the present disclosure. Server computer device 801 may include, but is not limited to, denoising computer device 140 (shown in FIG. 1) and database server 615 (shown in FIG. 6). Server computer device 801 also includes a processor 805 for executing instructions. Instructions may be stored in a memory area 810. Processor 805 may include one or more processing units (e.g., in a multi-core configuration).

Processor 805 is operatively coupled to a communication interface 815 such that server computer device 801 is capable of communicating with a remote device such as another server computer device 801, denoising computer device 140, sensors 130, or user computer device 605 (shown in FIG. 6). For example, communication interface 815 may receive requests from user computer devices 605 and information from sensors 130 (shown in FIG. 1) via the Internet, as illustrated in FIG. 6.

Processor 805 may also be operatively coupled to a storage device 834. Storage device 834 is any computer-operated hardware suitable for storing and/or retrieving data, such as, but not limited to, data associated with database 615 (shown in FIG. 6). In some embodiments, storage device 834 is integrated in server computer device 801. For example, server computer device 801 may include one or more hard disk drives as storage device 834. In other embodiments, storage device 834 is external to server computer device 801 and may be accessed by a plurality of server computer devices 801. For example, storage device 834 may include a storage area network (SAN), a network attached storage (NAS) system, and/or multiple storage units such as hard disks and/or solid-state disks in a redundant array of inexpensive disks (RAID) configuration.

In some embodiments, processor 805 is operatively coupled to storage device 834 via a storage interface 820. Storage interface 820 is any component capable of providing processor 805 with access to storage device 834. Storage interface 820 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 805 with access to storage device 834.

Processor 805 executes computer-executable instructions for implementing aspects of the disclosure. In some embodiments, the processor 805 is transformed into a special purpose microprocessor by executing computer-executable instructions or by otherwise being programmed. For example, the processor 805 is programmed with instructions such as those disclosed in FIG. 2.

The computer-implemented methods and processes described herein may include additional, fewer, or alternate actions, including those discussed elsewhere herein. The present systems and methods may be implemented using one or more local or remote processors, transceivers, and/or sensors (such as processors, transceivers, and/or sensors mounted on computer systems or mobile devices, or associated with or remote servers), and/or through implementation of computer-executable instructions stored on non-transitory computer-readable media or medium. Unless described herein to the contrary, the various steps of the several processes may be performed in a different order, or simultaneously in some instances.

Additionally, the computer systems discussed herein may include additional, fewer, or alternative elements and respective functionalities, including those discussed elsewhere herein, which themselves may include or be implemented according to computer-executable instructions stored on non-transitory computer-readable media or medium.

In the exemplary embodiment, a processing element may be instructed to execute one or more of the processes and subprocesses described above by providing the processing element with computer-executable instructions to perform such steps/sub-steps, and store collected data (e.g., vehicle profiles, etc.) in a memory or storage associated therewith. This stored information may be used by the respective processing elements to make the determinations necessary to perform other relevant processing steps, as described above.

The aspects described herein may be implemented as part of one or more computer components, such as a client device, system, and/or components thereof, for example. Furthermore, one or more of the aspects described herein may be implemented as part of a computer network architecture and/or a cognitive computing architecture that facilitates communications between various other devices and/or components. Thus, the aspects described herein address and solve issues of a technical nature that are necessarily rooted in computer technology.

A processor or a processing element may be trained using supervised or unsupervised machine learning, and the machine learning program may employ a neural network, which may be a convolutional neural network, a deep learning neural network, a reinforced or reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as images, object statistics and information, traffic timing, previous trips, and/or actual timing. The machine learning programs may utilize deep learning algorithms that may be primarily focused on pattern recognition and may be trained after processing multiple examples. The machine learning programs may include Bayesian Program Learning (BPL), voice recognition and synthesis, image or object recognition, optical character recognition, and/or natural language processing—either individually or in combination. The machine learning programs may also include natural language processing, semantic analysis, automatic reasoning, and/or machine learning.

Supervised and unsupervised machine learning techniques may be used. In supervised machine learning, a processing element may be provided with example inputs and their associated outputs and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to determine how different photons exit the body based upon body structures.

Based upon these analyses, the processing element may learn how to identify characteristics and patterns that may then be applied to analyzing image data, model data, and/or other data. For example, the processing element may learn, to identify trends of locations based on photon vectors and locations. The processing element may also learn how to identify trends that may not be readily apparent based upon collected data, such as trends that identifying optimal placement of treatments in the body relative to tumors.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system. The above examples are not intended to limit in any way the definition and/or meaning of the term database. Examples of RDBMS's include, but are not limited to, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

A computer program of one embodiment is embodied on a computer-readable medium. In an example, the system is executed on a single computer system, without requiring a connection to a server computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable and include any computer program storage in memory for execution by personal computers, workstations, clients, servers, and respective processing elements thereof.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device, and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events may be considered to occur substantially instantaneously.

Exemplary embodiments of systems and methods for securely navigating traffic lights are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for single-photon emission computed tomography (SPECT) comprising a computer device comprises at least one processor in communication with at least one memory device, wherein the at least one processor is programmed to:

store a model trained to denoise computer tomography (CT) scans of a subject being examined, wherein the at least one processor is further programmed to train the model with a plurality of historical low-dose CT scans and a plurality of normal dose CT scans, wherein the plurality of historical low-dose CT scans are images of where the corresponding subject received a lower dose of a radioactive tracer than subjects of the normal dose CT scans;

receive a CT scan of a first subject being examined;

execute the model with the CT scan of the first subject as an input, wherein the model performs denoising on the CT scan while accounting for an observer loss function; and output a denoised-CT scan of the first subject.

2. The system of claim 1, wherein the lower dose is one of 12.5% and 6.25% of a normal dose.

3. The system of claim 1, wherein the at least one processor is further programmed to execute the model for a plurality of CT scans.

4. The system of claim 3, wherein the plurality of CT scans is a part of a video.

5. The system of claim 1, wherein the CT scan was taken during a myocardial perfusion.

6. The system of claim 1, wherein the at least one processor is further programmed to train the model with an observer loss function.

7. A method for single-photon emission computed tomography (SPECT), the method implemented by a computer device comprising at least one processor in communication with one or more memory devices, the method comprises:

storing a model trained to denoise computer tomography (CT) scans of a subject being examined;

receiving a CT scan of a first subject being examined, wherein the at least one processor is further programmed to train the model with a plurality of historical low-dose CT scans and a plurality of normal dose CT scans, wherein the plurality of historical low-dose CT scans are images of where the corresponding subject received a lower dose of a radioactive tracer than subjects of the normal dose CT scans;

executing the model with the CT scan of the first subject as an input, wherein the model performs denoising on the CT scan while accounting for an observer loss function; and outputting a denoised-CT scan of the first subject.

8. The method of claim 7, wherein the lower dose is one of 12.5% and 6.25% of a normal dose.

9. The method of claim 7 further comprising executing the model for a plurality of CT scans.

10. The method of claim 9, wherein the plurality of CT scans is a part of a video.

11. The method of claim 7, wherein the CT scan was taken during a myocardial perfusion.

12. The method of claim 7 further comprising training the model with an observer loss function.

13. A computer device for single-photon emission computed tomography (SPECT) comprising at least one processor in communication with at least one memory device, wherein the at least one processor is programmed to:

store a model trained to denoise computer tomography (CT) scans of a subject being examined, wherein the at least one processor is further programmed to train the model with a plurality of historical low-dose CT scans and a plurality of normal dose CT scans, wherein the plurality of historical low-dose CT scans are images of where the corresponding subject received a lower dose of a radioactive tracer than the subjects of normal dose CT scans;

receive a CT scan of a first subject being examined;

execute the model with the CT scan of the first subject as an input, wherein the model performs denoising on the CT scan while accounting for an observer loss function; and output a denoised-CT scan of the first subject.

14. The computer device of claim 13, wherein the lower dose is one of 12.5% and 6.25% of a normal dose.

15. The computer device of claim 13, wherein the at least one processor is further programmed to execute the model for a plurality of CT scans.

16. The computer device of claim 15, wherein the plurality of CT scans is a part of a video.

17. The computer device of claim 13, wherein the CT scan was taken during a myocardial perfusion.

* * * * *